United States Patent [19]

Falk

[11] 3,924,420
[45] Dec. 9, 1975

[54] HIGH DEFLECTION CONSTANT SPEED UNIVERSAL JOINT

[76] Inventor: James B. Falk, 3 Lake James, St. Louis, Mo. 63034

[22] Filed: Apr. 12, 1974

[21] Appl. No.: 460,434

[52] U.S. Cl............................ 64/21; 64/17 R; 64/18; 64/6
[51] Int. Cl.² ........................................... F16D 3/30
[58] Field of Search.............. 64/21, 17 R, 17 A, 18, 64/19, 6

[56] References Cited
UNITED STATES PATENTS

| | | | |
|---|---|---|---|
| 3,456,458 | 7/1969 | Dixon | 64/21 |
| 3,461,688 | 8/1969 | Garfinkle | 64/18 |
| 3,517,528 | 6/1970 | Eccher | 64/21 |

FOREIGN PATENTS OR APPLICATIONS

| | | | |
|---|---|---|---|
| 350,634 | 6/1931 | United Kingdom | 64/21 |
| 575,534 | 4/1958 | Italy | 64/21 |
| 1,097,613 | 7/1955 | France | 64/21 |

Primary Examiner—Samuel Scott
Assistant Examiner—Randall Heald
Attorney, Agent, or Firm—Rogers, Ezell & Eilers

[57] ABSTRACT

A high deflection constant speed universal joint has arcuate torque arms mounted on one end member, has arcuate torque arms mounted on a second end member, and has those arcuate torque arms mounted so they are concentric and so they define an imaginary sphere. A spider receives torsional forces from the torque arms on the one end member and transmits those torsional forces to the torque arms on the other end member. That spider permits the torque arms of the one end member to oscillate through a number of planes which pass through one axis of that spider and also permits those torque arms to rotate within each of those planes; and that spider permits the torque arms of the other end member to oscillate through a number of planes which intersect another axis of that spider and also permits those torque arms to rotate within each of those planes. As a result, that spider can transmit torsional forces from the torque arms of the one end member to the torque arms of the other end member while permitting those torque arms to oscillate through different planes and to rotate within those planes. Angle-dividing members are connected to the end members, and they apply forces to the spider which cause that spider to bisect the supplement of the angle of deflection between the axes of the end members; and hence the universal joint can operate as a constant speed universal joint.

18 Claims, 9 Drawing Figures

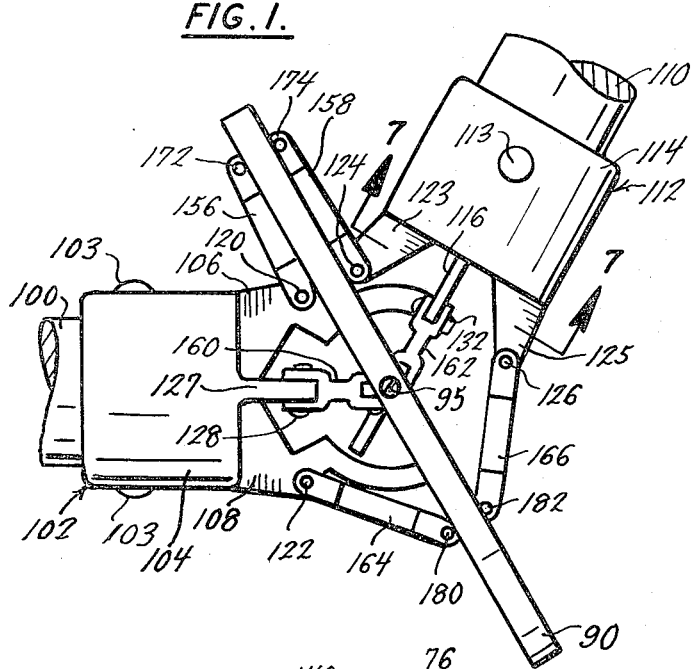
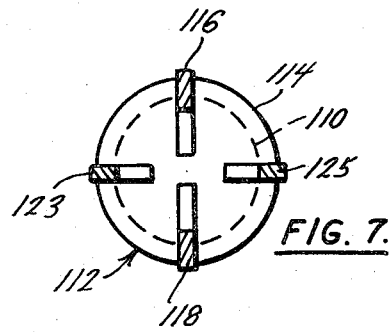
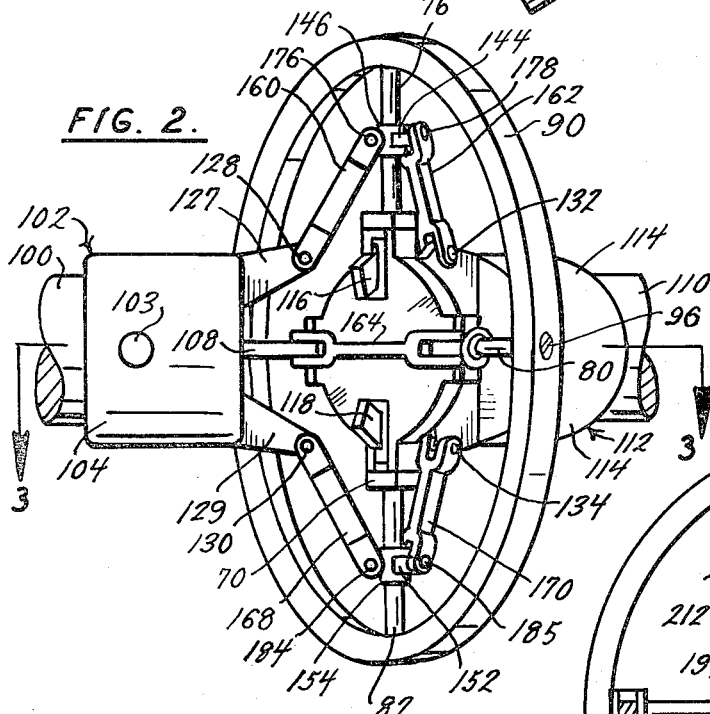
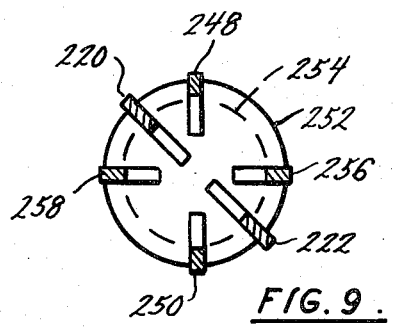
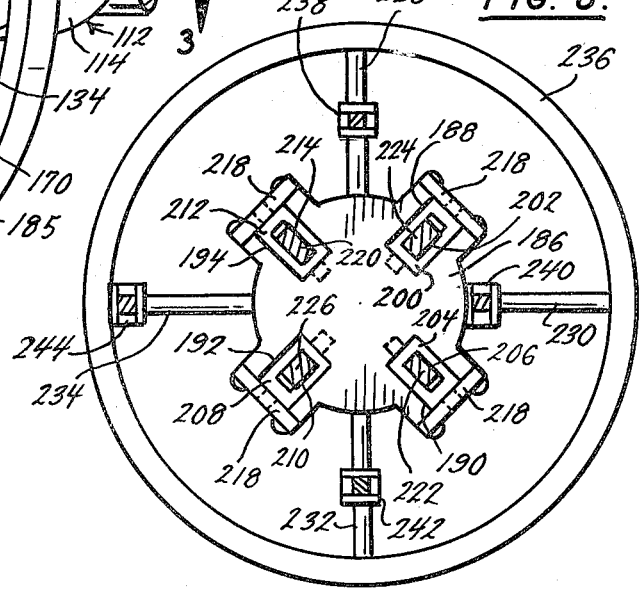

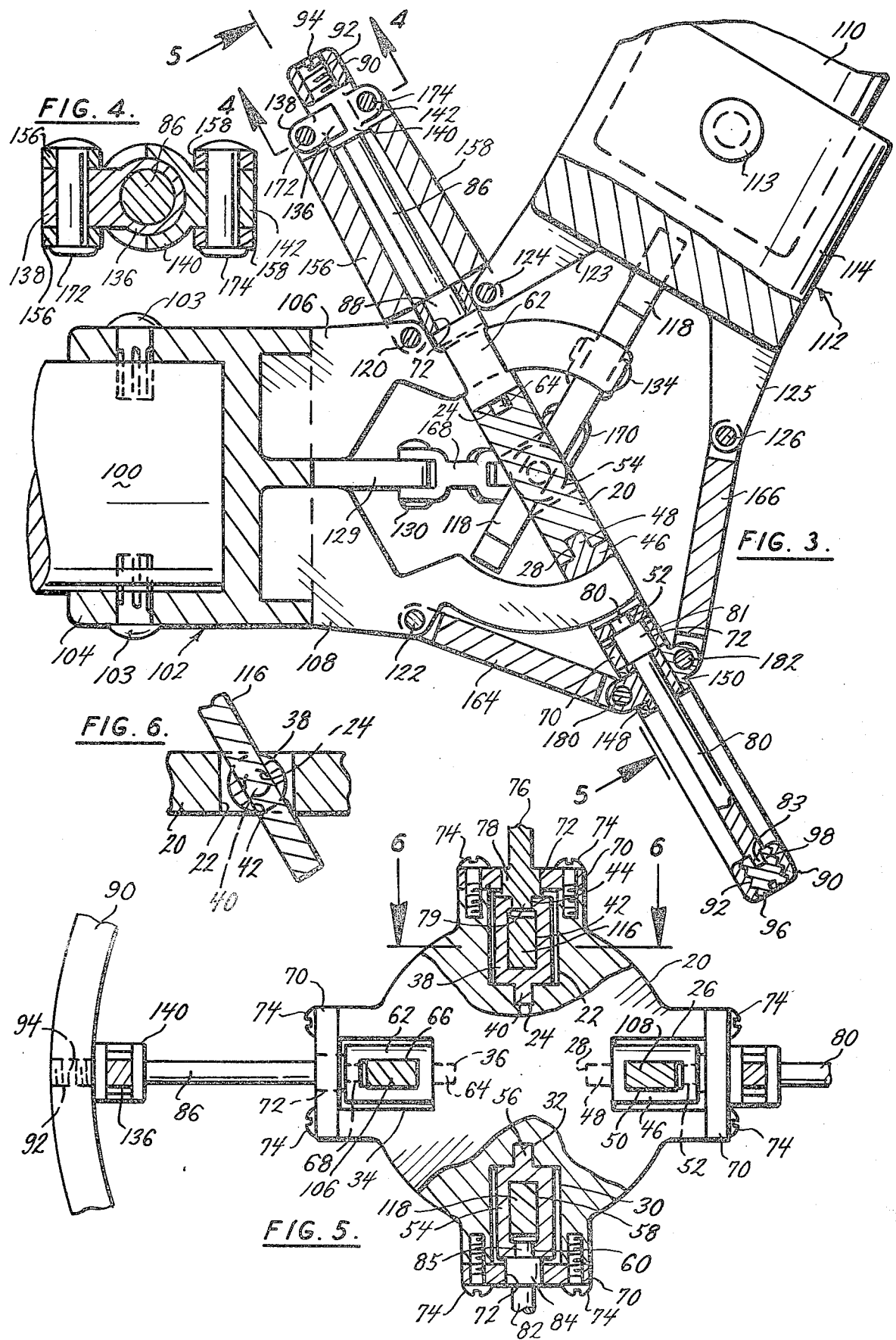

HIGH DEFLECTION CONSTANT SPEED UNIVERSAL JOINT

BACKGROUND OF THE INVENTION

Universal joints ordinarily are restricted to use in installations where only limited angles of deflection are anticipated. For example, universal joints usually are restricted to use in installations where the angles of deflection are 20° or smaller. However, in some installations, it would be very desirable to use universal joints which could interconnect shafts whose axes were displaced by angles larger than 20°. Also, although universal joints cause driven shafts and the driving shafts therefor to have the same average speeds, most shafts which are driven by universal joints experience acceleration and deceleration forces during each revolution thereof.

SUMMARY OF THE PRESENT INVENTION

The present invention provides a universal joint which can interconnect shafts whose axes are displaced by angles which are larger than 20°. Further, that universal joint causes the driven shaft to move at the same speed as the driving shaft and to be free of acceleration and deceleration forces during each revolution thereof. It is, therefore, an object of the present invention to provide a high deflection constant speed universal joint.

The universal joint provided by the present invention has an end member which is provided with arcuate torque arms, has a second end member which is provided with arcuate torque arms, and holds those arcuate torque arms so they are concentric and so they define an imaginary sphere. Those torque arms lie in planes which are angularly displaced from each other, and those torque arms can rotate within those planes. As a result, those torque arms, and hence those end elements, can be moved through angles of deflection in excess of 20°. It is, therefore, an object of the present invention to provide an end member with arcuate torque arms, to provide a second end member with arcuate torque arms, and to hold those torque arms so they are concentric and so they define an imaginary sphere.

The present invention has a spider intermediate the end elements thereof; and it provides angle-dividing members which cause the spider to bisect the supplement of the angle of deflection between the axes of those end members. By causing that spider to always bisect that supplement of that angle, those angle-dividing members enable the universal joint to operate as a constant speed universal joint. It is, therefore, an object of the present invention to provide a universal joint with a spider which always bisects the supplement of the angle of deflection between the axes of the end elements of that universal joint.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a plan view of one preferred embodiment of universal joint which is made in accordance with the principles and teachings of the present invention, and it shows the axes of the end elements of that universal joint defining a deflection angle which is larger than 50°;

FIG. 2 is a front elevational view of the universal joint shown in FIG. 1;

FIG. 3 is a sectional view, on a larger scale, through the universal joint of FIG. 1, and it is taken along the plane indicated by the line 3—3 in FIG. 2;

FIG. 4 is a sectional view, on an even larger scale, through a portion of the universal joint of FIG. 1, and it is taken along the plane indicated by the line 4—4 in FIG. 3;

FIG. 5 is a broken sectional view, on the scale of FIG. 4, through the universal joint of FIG. 1, and it is taken along the plane indicated by the line 5—5 in FIG. 3;

FIG. 6 is a sectional view, on the scale of FIG. 3, through a portion of the universal joint of FIG. 1, and it is taken along the plane indicated by the line 6—6 in FIG. 5;

FIG. 7 is a sectional view, on the scale of FIG. 1, through the universal joint of FIG. 1, and it is taken along the plane indicated by the line 7—7 in FIG. 1;

FIG. 8 is a sectional view, on the scale of FIG. 1, through a second preferred embodiment of universal joint, and it is taken along a plane which is comparable to the plane indicated by the line 5—5 of FIG. 3; and FIG. 9 is a sectional view through the universal joint of FIG. 8, and it is taken along a plane which is comparable to the plane denoted by the line 7—7 in FIG. 1.

DETAILED DESCRIPTION OF PREFERRED EMBODIMENT OF FIGS. 1-7

Referring particularly to FIGS. 1-7, the numeral 20 denotes a spider which is generally circular in elevation, as indicated in FIG. 5, and which has flat faces, as indicated by FIGS. 3 and 6. That spider has four radially-directed slots 22, 26, 30 and 34; and the slots 22 and 30 are located at the opposite ends of one diameter of that spider, whereas the slots 26 and 34 are located at the opposite ends of an orthogonally-displaced diameter of that spider. Cylindrical sockets 24 and 32 extend inwardly toward each other from the inner ends of the slots 22 and 30, as shown particularly by FIG. 5; and those sockets are coaxial with each other and with those slots. Sockets 28 and 36 extend inwardly toward each other from the inner ends of the slots 26 and 34; and those sockets are coaxial with each other and with those slots.

The numeral 38 denotes a torque-transferring member which is cylindrical in configuration and which has a diameter that is smaller than the width of the slot 22 in the spider 20. That torque-transferring member has a smaller-diameter cylindrical projection 40 which extends into the cylindrical socket 24, as shown particularly by FIG. 5. A slot 42 of rectangular cross-section passes through the axis of the torque-transferring member 38; but the inner end of that slot is convex and is concentric with a line passing through the geometric center of the spider 20. A small-diameter cylindrical recess 44 is provided in the outer end of that torque-transferring member; and that recess communicates with the slot 42. The numeral 46 denotes a torqueand 82 and by the torque-transferring members 38 and 54. The center of generation of the concave and convex surfaces on the arcuate arms of the torque-transmitting plates 116 and 118 is a further line passing through the geometric center of the spider 20; and that geometric center is the center of an imaginary sphere which is tangent to the concave surfaces on the arcuate arms of the torque-transmitting plates 116 and 118.

The numeral 120 denotes a pivot which is mounted on the torque-transmitting plate 106, and the numeral 122 denotes a pivot which is mounted on the torque-transmitting plate 108, as shown particularly by FIG. 3. The numerals 123 and 125 denote projections which are generally triangular in configuration and which extend inwardly from the inner end of the cup-like portion 114 of the end element 112, as shown by FIG. 1. Whenever the shafts 100 and 110 are coaxial, those projections lie in the plane which is defined by the torque-transmitting plates 106 and 108; and that plane passes through the diameter of spider 20 which is defined by the rods 80 and 86. The projection 123 supports a pivot 124 at the inner end thereof, while the projection 125 supports a pivot 126 at the inner end thereof. The numerals 127 and 129 denote projections which are generally triangular in configuration and which extend inwardly from the inner end of the cup-like portion 104 of the end element 102, as shown particularly in FIGS. 1–3. Whenever the shafts 100 and 110 are coaxial, those projections lie in the plane which is defined by the torque-transmitting plates 116 and 118; and that plane passes through the diameter of spider 20 which is defined by the rods 76 and 82. A pivot 128 is supported by the inner end of the projection 127 while a pivot 130 is supported by the inner end of the projection 129 as shown particularly by FIG. 2. The numeral 132 denotes a pivot which is supported by the torque-transmitting plate 116; and the numeral 134 denotes a pivot which is supported by the torque-transmitting plate 118, as shown particularly by FIG. 2.

The numeral 136 denotes a sleeve which has a perforated ear 138, and that sleeve encircles the rod 86, as shown particularly by FIGS. 3 and 5. The numeral 140 denotes a notched sleeve which has a perforated ear 142, and that sleeve encircles the sleeve 136. As a result, the sleeve 136 serves as a bearing for the notched sleeve 140 and permits ready relative rotation of those sleeves. The engagement between the sleeve 136 and the rod 86 is sufficiently loose to permit the sleeves 136 and 140 to act as a slide which readily reciprocates along the length of that rod. The ear 138 can be attached to the sleeve 136 in any suitable manner, as by a brazing operation, by a welding operation, or by forming a threaded projection on that ear which extends into and seats within a threaded socket in the sleeve 136. The numeral 144 denotes a sleeve which can be identical to the sleeve 136, and the numeral 146 denotes a notched sleeve which can be identical to the notched sleeve 140; and the sleeves 144 and 146 coact to constitute a slide which encircles, and which can readily reciprocate along the length of, the rod 76. The numeral 148 denotes a sleeve which can be identical to the sleeve 136, and the numeral 150 denotes a notched sleeve which can be identical to the notched sleeve 140; and the sleeves 148 and 150 coact to constitute a slide which encircles, and which can readily reciprocate along the length of, the rod 80. The numeral 152 denotes a sleeve which can be identical to the sleeve 136, and the numeral 154 denotes a notched sleeve which can be identical to the notched sleeve 140; and the sleeves 152 and 154 coact to constitute a slide which encircles, and which can readily reciprocate along the length, of the rod 82.

The numeral 156 denotes an angle-dividing arm which has slots in the opposite ends thereof; and the inner end of that arm is pivotally secured to the torque-transmitting plate 106 by the pivot 120 while the outer end of that arm is pivotally secured to the ear 138 of the sleeve 136 by a pin 172. The numerals 158, 160, 162, 164, 166, 168 and 170 denote further angle-dividing arms which are identical to the angle-dividing arm 156. The inner end of the angle-dividing arm 158 is pivotally secured to the projection 123 by the pivot 124, while the outer end of that arm is pivotally secured to the ear 142 on the sleeve 140 by a pin 174. The inner end of the angle-dividing arm 160 is pivotally secured to the projection 127 by the pivot 128, while the outer end of that arm is pivotally secured to the ear on the slotted sleeve 146 by a pin 176. The inner end of the angle-dividing arm 162 is pivotally secured to the torque-transmitting plate 116 by the pivot 132, while the outer end of that arm is pivotally-secured to the ear of the sleeve 144 by a pin 178. The inner end of the angle-dividing arm 164 is pivotally secured to the torque-transmitting plate 108 by the pivot 122, while the outer end of that arm is pivotally secured to the ear on the sleeve 148 by a pin 180. The inner end of the angle-dividing arm 166 is pivotally secured to the projection 125 by the pivot 126, while the outer end of that arm is pivotally secured to the ear on the slotted sleeve 150 by a pin 182. The inner end of the angle-dividing arm 168 is pivotally secured to the projection 129 by the pin 130, while the outer end of that arm is pivotally secured to the ear on the slotted sleeve 154 by a pin 184. The inner end of the angle-dividing arm 170 is pivotally secured to the torque-transmitting plate 118 by the pivot 134, while the other end of that arm is pivotally secured to the ear of the sleeve 152 by a pin 185.

All of the arms 156, 158, 160, 162, 164, 166, 168 and 170 have the same length; and the pins which secure the outer ends of any two of those arms to a slide are directly in register with each other and are spaced the same distance from the geometric center of the spider 20. Similarly, the pivots 120, 122, 124, 126, 128, 130, 132 and 134 are all spaced the same distance from that geometric center. Consequently, each pair of arms coacts with the rod, which is subtended between them, to define an angle and a bisector for that angle. In this way, the arms 156, 158, 160, 162, 164, 166, 168 and 170 always hold the spider 20 so it bisects the supplement of the angle of deflection between the axes of the shafts 100 and 110.

The forces which the driving shaft 100 applies to the end element 102 will be transmitted to that end element by the fasteners 103. That end element will cause the arcuate arms on the torque-transmitting plates 106 and 108 to apply circumferentially-directed forces to the torque-transferring members 62 and 46, respectively. Those circumferentially-directed forces will be tranferred to the spider 20 by the cylindrical projections 64 and 48 within the sockets 36 and 28, respectively; and also by the inner ends and enlarged-diameter portions of the rods 86 and 80 and the closure plates 70 for the slots 34 and 26. The spider 20 then will act through the cylindrical sockets 24 and 32, the cylindrical projections 40 and 56, the closure plates 70 for the slots 22 and 30, and the inner ends and the enlarged-diameter portions of the rods 76 and 82 to cause the torque-transferring members 38 and 54 to apply circumferentially-directed forces to the arcuate arms of the torque-transmitting plates 116 and 118. Those torque-transmitting plates will, of course, apply corresponding rotational forces to the end element 112, and hence to the driven shaft 110 via fasteners 113.

The sliding connections which the torque-transferring members 62 and 46 provide between the spider 20 and the arcuate arms of the torque-transmitting plates 106 and 108 enable that spider to tilt in the clockwise and counter clockwise directions in FIG. 3 relative to the axis which is defined by the rods 76 and 82; and that spider can tilt about that axis as many as 30° in either direction from the axis of the shaft 100. The pivoting connections which the torque-transferring members 38 and 54 provide between the spider 20 and the arcuate arms of the torque-transmitting plates 116 and 118 enable that spider to tilt in the clockwise and counter clockwise directions in FIG. 1 relative to the axis defined by the rods 76 and 82; and that spider can tilt about that axis as many as 30° in either direction from the axis of the shaft 110. The sliding connections which the torque-transferring members 38 and 54 provide between the spider 20 and the arcuate arms of the torque-transmitting plates 116 and 118 in FIG. 2 enable that spider to tilt in the clockwise and counter clockwise directions in FIG. 2, relative to the axis which is defined by the rods 80 and 86; and that spider can tilt about that axis as many as 30° in either direction from the axis of the shaft 110. The pivoting connections which the torque-transferring members 62 and 46 provide between the spider 20 and the arcuate arms of the torque-transmitting plates 106 and 108 enable that spider to tilt in the clockwise and counter clockwise directions in FIG. 3 relative to the axis defined by the rods 80 and 86; and that spider can tilt about that axis as many as 30° in either direction from the axis of the shaft 100. The overall result is that the axes of the shaft 100 and 110 can be displaced from each other by as many as 60°.

The arcuate arms of the torque-transmitting plates 106 and 108 are made long enough to permit the spider 20 to tilt as much as 30° from the axis of the shaft 100 without causing the torque-transferring members 46 and 62 to become separated from those arcuate arms. To enable the ends of the arcuate arms of the torque-transmitting plates 106 and 108 to move through such a large angle, the torque-transmitting plates 116 and 118 are formed so they define an open area which can accommodate the free ends of those arcuate arms as the angle of deflection between the shafts 100 and 110 approaches 40°. Similarly, the arcuate arms of the torque-transmitting plates 116 and 118 both are made long enough to permit the spider 20 to tilt as much as thirty degrees from the axis of the shaft 110 without causing the torque-transferring members 38 and 54 to become separated from those arcuate arms. To enable the ends of the arcuate arms of the torque-transmitting plates 116 and 118 to move through such a large angle, the torque-transmitting plates 106 and 108 are formed so they define an open area which can accommodate the free ends of those arcuate arms as the angle of deflection between the shafts 100 and 110 approaches 40°.

During any given revolution which the shaft 100 makes, the plane in which the torque-transmitting plates 106 and 108 lie will rotate about the axis of shaft 100 and will thereby enable the arcuate arms of those plates to cause the spider 20 to rotate about that axis. That spider will then cause the arcuate arms of the torque-transmitting plates 116 and 118 to rotate about the axis of the shaft 110, and will thereby cause that shaft to rotate about its axis. During the rotations of the torque-transmitting plates 106, 108, 116 and 118, the angle-dividing arms 156, 158, 160, 162, 164, 166, 168 and 170 will hold the spider 20 and the ring 90 within a plane which bisects the supplement of the angle subtended by the axes of those shafts. Where that subtended angle is other than 180°, the plane, in which the torque-transmitting plates 106 and 108 lie, will swing back and forth relative to the plane in which the spider 20 and the ring 90 lie; and, in addition, those torque-transmitting plates will rotate wihin the plane in which they lie. Specifically, during each revolution of the shaft 100, the plane, in which the torque-transmitting plates 106 and 108 lie, will swing in one direction about the axis defined by the rods 80 and 86 until it is displaced from the axis of the spider 20 by an angle equal to one half the angle of deflection between the axes of the shafts 100 and 110; and then that plane will swing back in the opposite direction through and beyond the axis of the spider 20 until it is again displaced from the axis of that spider by an angle equal to one half the angle of deflection between the axes of the shafts 100 and 110. Further, the arcuate arm of each of the torque-transmitting plates 106 and 108 will, during each revolution of the shaft 100, rotate in one direction within its plane until it is displaced from the axis of the spider 20 by an angle equal to one half the angle of deflection between the axes of the shafts 100 and 110; and then each of those arcuate arms will rotate in the opposite direction in that plane through and beyond the axis of the spider 20 until it is again displaced from that spider by an angle equal to one half the angle of deflection between the axes of the shafts 100 and 110. Similarly, the plane in which the torque-transmitting plates 116 and 118 lie will swing in one direction about the axis defined by the rods 76 and 82 until it is displaced from the axis of the spider 20 by an angle equal to one half the angle of deflection between the axes of the shafts 100 and 110; and then that plane will swing back in the opposite direction through and beyond the axis of the spider 20 until it is again displaced from the axis of that spider by an angle equal to one half the angle of deflection between the axes of the shafts 100 and 110. Further, the arcuate arm of each of the torque-transmitting plates 116 and 118 will, during each revolution of the end element 100, rotate in one direction within its plane until it is displaced from the axis of the spider 20 by an angle equal to one half the angle of deflection between the axes of the shafts 100 and 110; and then each of these arcuate arms will rotate in the opposite direction in that plane through and beyond the axis of the spider 20 until it is again displaced from that spider by an angle equal to one half the angle of deflection between the axes of the shafts 100 and 110. In addition, where the angle subtended by the axes of the shafts 100 and 110 is other than 180°, the slides which are constituted by the various sleeves 136 and 140, 144 and 146, 148 and 150, and 152 and 154 will reciprocate along the lengths of the rods 86, 76, 80 and 82; and the angle-dividing arms 156, 158, 160, 162, 164, 166, 168 and 170 will oscillate. As the arms of any pair of those arms oscillate, those arms will apply forces to those sleeves which will oppose or buck each other; and, similarly, those arms will apply forces to the end elements 102 and 112 which will oppose or buck each other. However, the net result of the action of the various angle-dividing arms is to hold the spider 20 in position so it always bisects the supplement of the angle of deflection between the axes of the shafts 100 and 110. This is important; because it enables the universal joint provided by the present invention to be a constant speed universal joint.

Any end thrusts which must be transmitted from the shaft 100 to the shaft 110 will be transmitted by the former shaft to the arcuate arms of the torque-transmitting plates 106 and 108, will be transmitted by the confronting concave surfaces on those arcuate arms to the convex inner ends of the slots in the torque-transferring members 62 and 46, and then will be transmitted to the spider 20 by the pivots for those torque-transferring members. That spider will transmit those end thrusts to the torque-transferring members 38 and 54, via the pivots for those torque-transferring members, the convex inner ends of the slots in those torque-transferring members will transmit those end thrusts to the confronting concave surfaces on the arcuate arms of the torque-transmitting plates 116 and 118, and then those torque-transmitting plates will transmit those end thrusts to the shaft 110. If heavy end thrusts or loads were anticipated, projections could be formed at each face of each of the torque-transferring members 38, 46, 54 and 62 in register with the inner ends of the slots in those torque-transferring members. Those projections could serve as extensions of the convex inner ends of those slots, and thus could increase the bearing areas between the arcuate arms of the torque-transmitting plates and those torque-transferring members.

The rectangular slots 42, 50, 58 and 66, respectively, in the torque-transferring members 38, 46, 54 and 62, respectively, are longer than the radial dimensions of the arcuate arms of the torque-transmitting plates 116, 108, 118 and 106. As a result, those slots prevent binding of those torque-transmitting plates relative to those torque-transferring members, as the arcuate arms of those torque-transmitting plates rotate within their planes. Further, because those torque-transferring members rotate readily relative to the spider 20, those torque-transferring members prevent binding as the planes, in which the torque-transmitting plates lie, swing relative to the plane of the spider 20.

A boot, not shown, of sturdy but flexible material will encase the cup-like portions 104 and 114 of the end members 102 and 112 and all intervening portions of the universal joint provided by the present invention. One end of that boot will be supported by, and sealed to, the cup-like portion 104, the other end of that boot will be supported by, and sealed to, the cup-like portion 114, and the middle of that boot will be supported by the ring 90. That boot will keep dirt, dust, grit and other adulterants away from the intervening portions of the universal joint, and also will hold grease or some other lubricant in contact with those intervening portions.

In contrast to most universal joints, which have maximum deflection angles of about 35°, the universal joint of the present invention can accommodate deflection angles of about 60°. As a result, the universal joint of the present invention makes it possible to use a universal joint in installations where it now is necessary to use gearing.

Referring particularly to FIGS. 8 and 9, the numeral 186 denotes a spider which is similar to the spider 20 of FIGS. 1–7. Slots 188, 190, 192 and 194 are formed in the spider 186; and those slots preferably will be identical to the slots 22, 26, 30 and 34 in the spider 20 — having cylindrical sockets at the inner ends thereof, as shown by dotted lines in FIG. 8. Torque-transferring members 200, 204, 208 and 212 are disposed, respectively, within the slots 188, 190, 192 and 194; and those torque-transferring members can be essentially identical to the torque-transferring member 38 of FIGS. 1–7 — having slots therein and having cylindrical projections on the inner ends thereof that are confined and guided by the cylindrical recesses at the inner ends of the slots 200, 204, 208, and 212, but having cylindrical projections rather than cylindrical recesses on the outer ends thereof. The slot 202 in the torque-transferring member 200 accommodates the arcuate arm of a torque-transmitting plate 224; and the slot 210 in the torque-transferring member 208 accommodates the arcuate arm of a torque-transmitting plate 226. Those torque-transmitting plates lie in the same plane, and they can be identical to the torque-transmitting plates 116 and 118 of FIGS. 1–7. Ths slot 206 in the torque-transferring member 204 accommodates the arcuate arm of a torque-transmitting plate 222; and the slot 214 in the torque-transferring member 212 accommodates the arcuate arm of a torque-transmitting plate 220. The torque-transmitting plates 220 and 222 lie in the same plane and they can be identical to the torque-transmitting plates 106 and 108 of FIGS. 1–7. Closure plates 218 close the outer ends of the slots 188, 190, 192 and 194 in the spider 186; and those closure plates have openings therein which receive and guide the cylindrical projections on the outer ends of the torque-transferring members 200, 204, 208 and 212.

The numerals 228, 230, 232 and 234 denote rod which have the inner ends thereof fixedly secured to the spider 186, and which have the outer ends thereof fixedly secured to a ring 236 that can be similar to, but of smaller diameter than, the ring 90. As shown particularly by FIG. 8, the rods 228 and 232 lie on a diameter which is angularly displaced from the diameter passing through the slots 188 and 192, and also from the diameter which passes through the slots 190 and 194. Similarly, the rods 230 and 234 lie on a diameter which is angularly displaced from the diameter passing through the slots 188 and 192, and also from the diameter which passes through the slots 190 and 194. In the preferred embodiment shown by FIGS. 8 and 9, the rod 228 is half-way between the slots 194 and 188, the rod 230 is half-way between the slots 188 and 190, the rod 232 is half-way between the slots 190 and 192, and the rod 234 is half-way between the slots 192 and 194. That disposition of those rods enables the inner ends of those rods to be located closer to the geometric axis of the spider 186 than are the inner ends of the rods 76, 80, 82 and 86 to the geometric axis of the spider 20. Further, that disposition of the rods 228, 230, 232 and 234 makes it possible to use a ring 236 which has a smaller diameter than that of the ring 90.

The numerals 238, 240, 242 and 244 denote slides which reciprocate relative to the rods 228, 230, 232 and 234, respectively. Those slides can be identical to the slides which are constituted by the sleeves 136 and 140, 144 and 146, 148 and 150, and 152 and 154 of FIGS. 1–7. Eight angle-dividing arms, not shown, will have the outer ends thereof pivotally secured to appropriate ones of the sleeves 238, 240, 242 and 244; and two of the angle-dividing arms which have the outer ends thereof pivotally connected to the sleeves 238 and 242 will have the inner ends thereof pivotally secured to projections 248 and 250 that are similar to the projections 123 and 125 and that are integral with a cup-like portion 252 of an end element that is secured to a shaft 254. Two further angle-dividing arms, not shown, which have the outer ends thereof pivotally secured to the sleeves 238 and 242 have the inner ends thereof pivotally secured to two projections, not shown, on the cup-like portion of the other end element of the universal joint of FIGS. 8 and 9. The projections, not shown, on that other cup-like portion will be coplanar with the projections 248 and 250 whenever the axes of the two end elements are coaxial. Two of the angle-dividing arms which have the outer ends thereof pivotally secured to the sleeves 240 and 244 have the inner ends thereof pivotally secured to projections 256 and 258 that are similar to the projections 248 and 250 and that are integral with the cup-like portion 252. Two further angle-dividing arms, not shown, which have the outer ends thereof pivotally secured to the sleeves 240 and 244 have the inner ends thereof pivotally secured to two further projections, not shown, on the cup-like portion for the other end element of the universal joint of FIGS. 8 and 9. The further projections, not shown, on that other cup-like portion will be coplanar with the projections 256 and 258 whenever the axes of the two end elements are coaxial. Because the ring 236, of the universal joint in FIGS. 8 and 9, is relatively smaller in diameter than is the ring 90 of the universal joint of FIGS. 1–7, the universal joint of FIGS. 8 and 9 can be made smaller and more compact than the universal joint of FIGS. 1–7.

In the universal joint of FIGS. 1–7, the angle-dividing arms 156, 158, 160, 162, 164, 166, 168 and 170 incline outwardly toward the slides which reciprocate on the rods 76, 80, 82 and 84. Similarly, the angle-dividing arms, not shown, for the universal joint of FIGS. 8 and 9 incline outwardly toward the slides 238, 240, 242 and 244. However, if desired, the projections 248, 250, 256 and 258, and the corresponding projections, not shown, on the counterpart of the cup-like portion 252, could be made so they extended outwardly radially as far as the outer diameter of the ring 236. In such event, the angle-dividing arms of the universal joint of FIGS. 8 and 9, could incline inwardly, rather than outwardly, to engage the slides 238, 240, 242 and 244. Those angle-dividing arms might, however, have to be curved to provide clearance when the spider 186 was in its position of maximum tilt relative to the axis of the shaft 254 or the axis of the counterpart shaft.

If desired, the angle-dividing arms of the universal joint of FIGS. 8 and 9 could be replaced by springs which would be connected to the periphery of the spider 186 and also to the projections 248, 250, 256 and 258 on the cup-like portion 252, and to four corresponding projections on the counterpart of that cup-like portion. Each spring would extend between a point on the periphery of the spider 186 and a point on one of the projections, and it would preferably be pivoted to that spider, to that projection, or to both. Further, the points of securement of the springs to the spider would be in the positions where the rods 228, 230, 232 and 234 are shown secured to that spider in FIG. 8. However, where springs were used to supplant the angle-dividing arms, those rods, the slides 238, 240, 242 and 244, and the ring 236 would be eliminated. The springs could be generally S-shaped in side elevation; and each of them could have an axially-directed portion securable to one of the projections, could have an outwardly-extending portion, and could have a second axially-directed portion which was secured to the periphery of the spider 186. Those springs would yield to permit tilting of that spider relative to the axes of the end elements of the universal joint of FIGS. 8 and 9, but those springs would have sufficient restorative forces therein to hold that spider so it would always bisect the supplement of the angle of deflection of that universal joint.

If it ever became desirable to reduce the frictional forces between the torque-transferring members and the arcuate arms of the torque-transmitting plates of the universal joints of FIGS. 1–7 or of FIGS. 8 and 9, the sides and the inner ends of the slots in those torque-transferring members could be defined by rollers. The rollers which would be used to define the sides of those slots would preferably be tapered rollers such as are used in tapered roller bearings; but the rollers which would be used to define the inner ends of those slots would be constant diameter rollers.

The angle-dividing arms of the embodiments shown in FIGS. 1–7 and in FIGS. 8 and 9 always hold the spiders so they bisect the supplements of the angles of deflection of those embodiments. Also, those angle-dividing arms coact with the rest of the components of those embodiments to make the overall configurations of those embodiments sufficiently symmetrical to keep the spiders from wobbling as the shafts of those embodiments rotate. All of this means that the embodiments of FIGS. 1–7 and of FIGS. 8 and 9 provide a balanced torque which effectively relieves the angle-dividing arms from the torquing forces which the driving shafts apply to the driven shafts. As a result, the only forces which those angle-dividing arms must be able to withstand are frictional forces; and hence those angle-dividing arms can be made light and of small mass.

Whereas the drawing and accompanying description have shown and described two preferred embodiments of the present invention it should be apparent to those skilled in the art that various changes may be made in the form of the invention without affecting the scope thereof.

What I claim is:

1. A substantially constant-speed universal joint which can provide balanced torque and which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, and further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it divides the supplement of any angle of deflection between the axes of said first said and said second end members, said centering means including a plurality of sliding elements and a plurality of connecting members and a plurality of pivots, each of said connecting members being connected to one of said sliding elements and to an end element by a pivot at each end thereof, whereby said connecting members remain substantially free of bending moments while said one of said end members is transmitting torque to said other of said end members, said intermediate member having a plurality of elements which help define a third plane that is angularly displaced from both said first said and said second planes, said plurality of elements always being substantially coplanar, said plurality of elements including some of the first said interacting surfaces and some of said further interacting surfaces and guiding elements for said sliding elements of said centering means.

2. A substantially constant-speed universal joint which can provide balanced torque and which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, and centering means connected to said intermediate member and to each of said end members to hold said intermediate member so it divides the supplement of any angle of deflection between the axes of said first said and said second end members, said intermediate member having a plurality of radially-directed guiding surfaces thereon, said centering means including a plurality of sliding elements and a plurality of connecting members and a plurality of pivots, said sliding elements of said centering means engaging and being guided by said radially-directed guiding surfaces on said intermediate member, each of said connecting members being connected to one of said sliding elements and to an end element by a pivot at each end thereof, whereby said connecting members remain substantially free of bending moments while said one of said end members is transmitting torque to said other of said end members.

3. A substantially constant-speed universal joint which can provide balanced torque and which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it divides the supplement of any angle of deflection between the axes of said first said and said second end members, said centering means including a plurality of sliding element and a plurality of connecting members and a plurality of pivots, each of said connecting members being connected to one of said sliding elements and to an end element by a pivot at each end thereof, whereby said connecting members remain substantially free of bending moments while said one of said end members is transmitting torque to said other of said end members, at least some of said interacting surfaces being arcuate and being concentric with the point of intersection of the axes of said first said and said second end members, and at least some of said further interacting surfaces being arcuate and being concentric with said point of intersection of said axes of said first said and said second end members.

4. A substantially constant-speed universal joint which can provide balanced torque and which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it divides the supplement of any angle of deflection between the axes of said first said and said second end members, said centering means including a plurality of sliding element and a plurality of connecting members and a plurality of pivots, each of said connecting members being connected to one of said sliding elements and to an end element by a pivot at each end thereof, whereby said connecting members remain substantially free of bending moments while said one of said end members is transmitting torque to said other of said end members, at least one of said interacting surfaces being arcuate and helping define the surface of an imaginary sphere, at least one of said further interacting surfaces being arcuate and helping define the surface of said imaginary sphere, said one arcuate interacting surface being on said torque-transmitting arm on said first end member, and said one further arcuate interacting surfaces being on said torque-transmitting arm on said second end member.

5. A substantially constant-speed universal joint which can provide balanced torque and which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it divides the supplement of any angle of deflection between the axes of said first said and said second end members, said centering means including a plurality of sliding elements and a plurality of connecting members and a plurality of pivots, each of said connecting members being connected to one of said sliding elements and to an end element by a pivot at each end thereof, whereby said connecting members remain substantially free of bending moments while said one of said end members is transmitting torque to said other of said end members, at least some of said interacting surfaces being arcuate and helping define the surface of an imaginary sphere, at least some of said further interacting surfaces being arcuate and helping define the surface of said imaginary sphere, and the geometric center of said imaginary sphere being at the point of intersection of the axes of said first said and said second end members.

6. A substantially constant-speed universal joint which comprises an end member with a torque-transmitting arm thereon that lies in a first plane, a second end member with a torque-transmitting arm thereon that lies in a second plane, and intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it divides the supplement of any angle of deflection between the axes of said first said and said second end members, said centering means including a plurality of sliding elements and a plurality of connecting members and a plurality of pivots, each of said connecting members being connected to one of said sliding elements and to an end element by a pivot at each end thereof, whereby said connecting members remain substantially free of bending moments while said one of said end members is transmitting torque to said other of said end members, said first said end member having a second torque-transmitting arm thereon that lies in said first plane, said second end member having a second torque-transmitting arm thereon that lies in said second plane, still further interacting surfaces on said intermediate member and on said second torque-transmitting arm on said first said end member which provide a swinging and sliding torque-transmitting connection between said intermediate member and said second torque-transmitting arm on said first said end member that permits said first plane to swing relative to said intermediate member and that also permits said second torque-transmitting arm on said first said end member to rotate within said first plane while said one of said end members is transmitting torque to said other of said end members, and additional interacting surfaces on said intermediate member and on said second torque-transmitting arm on said second end member which provide a swinging and sliding engagement between said intermediate member and said second torque-transmitting arm on said second end member that permits said second plane to swing relative to said intermediate member and that also permits said torque-transmitting arm on said second end member to rotate within said second plane while said one of said end members is transmitting torque to said other of said end members.

7. A substantially constant-speed universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it divides the supplement of any angle of deflection between the axes of said first said and said second end members, said centering means including a plurality of sliding elements and a plurality of connecting members and a plurality of pivots, each of said connecting members being connected to one of said sliding elements and to an end element by a pivot at each end thereof, whereby said connecting members remain substantially free of bending moments while said one of said end members is transmitting torque to said other of said end members, said first said end member having a second torque-transmitting arm thereon that lies in said first plane, said second end member having a second torque-transmitting arm thereon that lies in said second plane, still further interacting surfaces on said intermediate member and on said second torque-transmitting arm on said first said end member which provide a swinging and sliding torque-transmitting connection between said intermediate member and said second torque-transmitting arm on said first said end member that permits said first plane to swing relative to said intermediate member and that also permits said second torque-transmitting arm on said first said end member to rotate within said first plane while said one of said end members is transmitting torque to said other of said end members, additional interacting surfaces on said intermediate member and on said second torque-transmitting arm on said second end member which provide a swinging and sliding torque-transmitting connection between said intermediate member and said second torque-transmitting arm on said second end member that permits said second plane to swing relative to said intermediate member and that also permits said second torque-transmitting arm on said second end member to rotate within said second plane while said one of said end members is transmitting torque to said other of said end members the free ends of the first said and said second torque-transmitting arms on said first said end member being spaced apart to accommodate the free ends of the first said and said second torque-transmitting arms on said second end member, said intermediate member having passages therethrough which accommodate portions of said first said and said second torque-transmitting arms on said first said end member, and said intermediate member having further passages threrethrough which accommodate portions of said first said and said second torque-transmitting arms on said second end member.

8. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members centering means connected to said intermediate member and to each of said end members to hold said intermediate member so it divides the supplement of any angle of deflection between the axes of said first said and said second end members, said centering means including a plurality of members all of which remain substantially free of bending moments while said one of said end members is transmitting torque to said other of said end members, at least some of said interacting surfaces being on an element which is rotatably held by said intermediate member, at least some of said further interacting surfaces being on a second element which is rotatably held by said intermediate member, said element which is rotatably held by said intermediate member having the axis of rotation thereof substantially parallel to a radius of said intermediate member, said second element which is rotatably held by said intermediate member having the axis of rotation thereof substantially parallel to a second and circumferentially-displaced radius of said intermediate member, and said element which is rotatably held by said intermediate member being spaced from and being rotatable independently of said second element which is rotatably held by said intermediate member.

9. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it substantially bisects the supplement of any angle of deflection between the axes of said first said and said second end members, said centering means including a plurality of elements which are connected to but which pivot freely relative to said first said end member and which apply centering forces to said intermediate member, said centering means including a plurality of further elements which are connected to but which pivot freely relative to said second end member and which apply centering forces to said intermediate member, said elements and said further elements of said centering means being able to pivot freely relative to said first said and to said second end members while said one of said end members is transmitting torque to said other of said end members.

10. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means to hold said intermediate member so it divides the supplement of any angle of deflection between the axes of said first said and said second end members, said centering means including a plurality of elements which are connected to but which pivot freely relative to said first said end member and which apply centering forces to said intermediate member, said centering means including a plurality of further elements which are connected to but which pivot freely relative to said second end member and which apply centering forces to said intermediate member, said centering forces which said plurality of elements apply to said intermediate member being yielding centering forces, whereby said intermediate member can tilt relative to the axis of said first said end member, said centering forces which said plurality of further elements apply to said intermediate member being yielding centering forces, whereby said intermediate member can tilt relative to the axis of said second end member, connection between said intermediate member and said plurality of elements which enable said plurality of elements to remain substantially free of bending moments while said one of said end members is transmitting torque to said other of said end members, and further connections between said intermediate member and said further plurality of elements which enable said further plurality of elements to remain substantially free of bending moments while said one of said end members is transmitting torque to said other of said end members.

11. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means to hold said intermediate member so it divides the supplement of any angle of deflection between the axes of said first said and said second end members, said centering means including a plurality of elements which are connected to but which pivot freely relative to said first said end member and which apply centering forces to said intermediate member, said centering means including a plurality of further elements which are connected to but which pivot freely relative to said second end member and which apply centering forces to said intermediate member, said centering forces which said plurality of elements apply to said intermediate member bucking said centering forces which said plurality of further centering elements apply to said intermediate member, said plurality of elements always having the axes thereof inclined to the axis of said first said end member, and said further plurality of elements always having the axes thereof inclined to the axis of said second end member.

12. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means to hold said intermediate member so it divides the supplement of any angle of deflection between the axes of said first said and said second end members, said intermediate member having a plurality of radially directed guiding surfaces thereon, said centering means including a plurality of slides and connecting arms that apply centering forces to said intermediate member, said centering means including a plurality of further slides and connecting arms that apply further centering forces to said intermediate member, said plurality of slides of said centering means being guided by some of said radially-directed guiding surfaces on said intermediate member, and said plurality of further slides of said centering means being guided by further of said radially-directed guiding surfaces on said intermediate member.

13. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means to hold said intermediate member so it divides the supplement of any angle of deflection between the axes of said first said and said second end members, said centering means including a plurality of elements which are pivotally connected to said first said end member and which apply centering forces to said intermediate member, said centering means including a plurality of further elements which are pivotally connected to said second end member and which apply centering forces to said intermediate member, some of said plurality of elements and some of said plurality of further elements being parallel to said first plane, and other of said plurality of elements and other of said plurality of further elements being parallel to said second plane.

14. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means to hold said intermediate member so it divides the supplement of any angle of deflection between the axes of said first said and said second end members, said intermediate member having a plurality of radially-directed guiding surfaces thereon, said centering means including a plurality of elements which are pivotally connected to said first said end member and which are guided by said radially-directed guiding surfaces on said intermediate member and which apply centering forces to said intermediate member, said centering means including a plurality of further elements which are pivotally connected to said second end member and which are guided by said radially-directed guiding surfaces on said intermediate member and which apply centering forces to said intermediate member, some of said plurality of elements and some of said plurality of further elements being angularly displaced from said first and said second planes, and other of said plurality of elements and other of said plurality of further elements being angularly displaced from said first and said second planes.

15. A universal joint which comprises an end member with a torque-transmitting arm thereon that lies in a first plane, second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means to hold said intermediate member so it divides the supplement of any angle of deflection between the axes of said first said and said second end members, said centering means being dimensioned to hold said intermediate member so it always equally divides the supplement of any angle of deflection between the axes of said first said and said second end members, said centering means including at least two angularly-displaced members that are connected to said first said end member and to said intermediate member, and said centering means including at least two further angularly-displaced members that are connected to said second end member and to said intermediate member.

16. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, the interacting surface on said intermediate member being shorter than the interacting surface on said torque-transmitting arm on said first said end member to limit all sliding between said interacting surfaces to an area immediately adjacent said intermediate member, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, the further interacting surfaces on said intermediate member being shorter than the further interacting surfaces on said torque-transmitting arm on said second end member to limit all sliding between said further interacting surfaces to an area immediately adjacent said intermediate member, centering means connected to said intermediate member and to each of said end members to hold said intermediate member so it divides the supplement of any angle of deflection between the axes of said first said and said second end members said first said end member having a second torque-transmitting arm thereon that lies in said first plane, said second end member having a second torque-transmitting arm thereon that lies in said second plane, still further interacting surfaces on said intermediate member and on said second torque-transmitting arm on said first said end member which provide a swinging and sliding engagement between said intermediate member and said second torque-transmitting arm on said first said end member that permits said first plane to swing relative to said intermediate member and that also permits said second torque-transmitting arm on said first said end member to rotate within said first plane while said one of said end members is transmitting torque to said other of said end members, the still further interacting surfaces on said intermediate member being shorter than the still further interacting surfaces on said second torque-transmitting arm on said first said end member to limit all sliding between said still further interacting surfaces to an area immediately adjacent said intermediate member, additional interacting surfaces on said intermediate member and on said second torque-transmitting arm on said second end member which provide a swinging and sliding engagement between said intermediate member and said second torque-transmitting arm on said second end member that permits said second plane to swing relative to said intermediate member and that also permits said torque-transmitting arm on said second end member to rotate within said second plane while said one of said end members is transmitting torque to said other of said end members, the additional interacting surfaces on said intermediate member being shorter than the additional interacting surfaces on said torque-transmitting arm on said second end member to limit all sliding between said additional interacting surfaces to an area immediately adjacent said intermediate member, at least some of the first said interacting surfaces being arcuate and helping define the surface of an imaginary sphere, at least some of said further interacting surfaces being arcuate and helping define the surface of said imaginary sphere, said still further interacting surfaces being arcuate and helping define the surface of said imaginary sphere, and at least some of said additional interacting surfaces being arcuate and helping define the surface of said imaginary sphere, whereby said universal joint can provide balanced torque.

17. A universal joint which comprises an end member with a torque-transmitting arm thereon that lies in a first plane, a second end member with a torque-transmitting arm thereon that lies in a second plane, an intermediate member which is disposed intermediate said end members and which coacts with said torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, centering means connected to said intermediate member and to each of said end members to hold said intermediate member so it divides the supplement of any angle of deflection between the axes of said first said and said second end members, said first said end member having a second torque-transmitting arm thereon that lies in said first plane, said second end member having a second torque-transmitting arm thereon that lies in said second plane, still further interacting surfaces on said intermediate member and on said second torque-transmitting arm on said first said end member which provide a swinging and sliding engagement between said intermediate member and said second torque-transmitting arm on said first said end member that permits said first plane to swing relative to said intermediate member and that also permits said second torque-transmitting arm on said first said end member to rotate within said first plane while said one of said end members is transmitting torque to said other of said end members additional interacting surfaces on said intermediate member and on said second torque-transmitting arm on said second end member which provide a swinging and sliding engagement between said intermediate member and said second torque-transmitting arm on said second end member that permits said second plane to swing relative to said intermediate member and that also permits said torque-transmitting arm on said second end member to rotate within said second plane while said one of said end members is transmitting torque to said other of said end members, at least some of the first said interacting surfaces being arcuate and helping define the surface of an imaginary sphere, at least some of said further interacting surfaces being arcuate and helping defind the surface of said imaginary sphere, at least some of said still further interacting surfaces being arcuate and helping define the surface of said imaginary sphere, at least some of said additional interacting surfaces being arcuate and helping define the surface of said imaginary sphere, said first said end member and said second end member being substantially symmetrical, whereby said universal joint can provide balanced torque, said intermediate member having passages therethrough which accommodate portions of said first said and said second torque-transmitting arms on said first said end member, and said intermediate member having further passages therethrough which accommodate portions of said first said and said second torque-transmitting arms on said second end member, whereby said portions of said first said and said second torque-transmitting arms on said first said and on said second end members are coextensive, at least in part, with the walls of the first said and of said further passages through said intermediate members.

18. A universal joint which comprises an end member with a torque-transmitting arm thereon that lies in a first plane, a second end member with a torque-transmitting arm thereon that lies in a second plane, an intermediate member which is disposed intermediate said end members and which coacts with torque-transmitting arm on the first said end member and which also coacts with said torque-transmitting arm on said second end member to transmit torque from one of said end members to the other of said end members and also to hold said second plane angularly displaced from said first plane, interacting surfaces on said intermediate member and on said torque-transmitting arm on said first said end member which provide a swinging and sliding torque-transmitting connection between said intermediate member and said torque-transmitting arm on said first said end member that permits said first plane to swing relative to said intermediate member and that also permits said torque-transmitting arm on said first said end member to rotate within said first plane while said one of said end members is transmitting torque to said other of said end members, further interacting surfaces on said intermediate member and on said torque-transmitting arm on said second end member which provide a swinging and sliding engagement between said intermediate member and said torque-transmitting arm on said second end member that permits said second plane to swing relative to said intermediate member and that also permits said torque-transmitting arm on said second end member to rotate within said second plane while said one of said end members is transmitting torque to said other of said end members, said first said end member having a second torque-transmitting arm thereon that lies in said first plane, said second end member having a second torque-transmitting arm thereon that lies in said second plane, still further interacting surfaces on said intermediate member and on said second torque-transmitting arm on said first said end member which provide a swinging and sliding engagement between said intermediate member and said second torque-transmitting arm on said first said end member that permits said first plane to swing relative to said intermediate member and that also permits said second torque-transmitting arm on said first said end member to rotate within said first plane while said one of said end members is transmitting torque to said other of said end members, additional interacting surfaces on said intermediate member and on said second torque-transmitting arm on said second end member which provide a swinging and sliding engagement between said intermediate member and said second torque-transmitting arm on said second end member that permits said second plane to swing relative to said intermediate member and that also permits said second torque-transmitting arm on said second end member to rotate within said second plane while said one of said end members is transmitting torque to said other of said end members, at least some of the first said interacting surfaces being arcuate and helping define the surface of an imaginary sphere, at least some of said further interacting surfaces being arcuate and helping define the surface of said imaginary sphere, at least some of said still further interacting surfaces being arcuate and helping define the surface of said imaginary sphere, at least some of said additional interacting surfaces being arcuate and helping define the surface of said imaginary sphere, centering means to hold said intermediate member so it divides the supplement of any angle of deflection between the axes of said first said and said second end members, whereby said universal joint can provide balanced torque, said intermediate member having spaces therein which receive elements that have passages therethrough which accommodate portions of said first said and said second torque-transmitting arms on said first said end members, and said intermediate member having further spaces therein which receive further movable elements that have passages therethrough which accommodate portions of said first said and said second torque-transmitting arms on said second end member, said portions of said first said and said second torque-transmitting arms on said first said end member being slidable in said passages in the first said movable elements, said portions of said first said and said second torque-transmitting arms on said second end member being slidable in said passages in said further movable elements, said intermediate member having a plurality of elements which help define a third plane that is angularly displaced from both said first said and said second planes, said plurality of elements always being substantially coplanar, said plurality of elements including some of the first said interacting surfaces and some of said further interacting surfaces and guiding elements for said sliding elements of said centering means.